(12) United States Patent
Bowe

(10) Patent No.: US 7,067,560 B2
(45) Date of Patent: Jun. 27, 2006

(54) PROCESSING NATURAL GAS TO FORM LONGER-CHAIN HYDROCARBONS

(75) Inventor: Michael Joseph Bowe, Preston (GB)

(73) Assignee: GTL Microsystems AG, Baar (CH)

( * ) Notice: Subject to any disclaimer, the term of this patent is extended or adjusted under 35 U.S.C. 154(b) by 0 days.

(21) Appl. No.: 11/078,359

(22) Filed: Mar. 14, 2005

(65) Prior Publication Data

US 2005/0209347 A1    Sep. 22, 2005

(30) Foreign Application Priority Data

Mar. 16, 2004    (GB) ................................. 0405786.5

(51) Int. Cl.
*C07C 27/00*    (2006.01)
(52) U.S. Cl. ...................... 518/700; 518/702; 518/703; 518/705
(58) Field of Classification Search ................ 518/700, 518/702, 703, 705
See application file for complete search history.

(56) References Cited

U.S. PATENT DOCUMENTS

| | | | |
|---|---|---|---|
| 2,568,953 A | 9/1951 | Dickinson | 260/449.6 |
| 4,093,029 A | 6/1978 | Weisz et al. | 166/305 R |
| 2002/0120017 A1* | 8/2002 | Bohn et al. | 518/703 |
| 2003/0134911 A1* | 7/2003 | Schanke et al. | 518/703 |

FOREIGN PATENT DOCUMENTS

| | | |
|---|---|---|
| WO | 01/51194 | 7/2001 |
| WO | 03/006149 | 1/2003 |
| WO | 03/033131 | 4/2003 |
| WO | 03/033133 | 4/2003 |
| WO | 03/048034 | 6/2003 |

\* cited by examiner

*Primary Examiner*—J. Parsa
(74) *Attorney, Agent, or Firm*—William H. Holt

(57) ABSTRACT

Natural gas is processed to generate longer-chain hydrocarbons, the process comprising subjecting the gas to steam reforming to generate a mixture of carbon monoxide and hydrogen, and then subjecting this mixture to Fischer-Tropsch synthesis. The reforming reaction (20) is performed at 0.4–0.5 MPa and the Fischer-Tropsch synthesis (50) at 1.8–2.1 MPa, and two compressors (36, 44) are used to raise the pressure, the gas mixture being cooled (26, 32, 40) before and after the first compressor (36). This reduces both the operating cost and capital cost of the plant.

8 Claims, 1 Drawing Sheet

PROCESSING NATURAL GAS TO FORM LONGER-CHAIN HYDROCARBONS

This invention relates to a chemical process to convert natural gas to longer-chain hydrocarbons, and to a plant including catalytic reactors suitable for use in performing the process.

BACKGROUND OF THE INVENTION

A process is described in WO 01/51194 and WO 03/048034 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to hydrocarbons of higher molecular weight, which are usually liquid under ambient conditions. The two stages of the process, steam/methane reforming and Fisher-Tropsch synthesis, require different catalysts, and catalytic reactors are described for each stage. The catalytic reactors enable heat to be transferred to or from the reacting gases, respectively, as the reactions are respectively endothermic and exothermic; the heat required for steam/methane reforming may be provided by combustion. The two stages operate most effectively at different pressures, but raising the pressure between the two stages is expensive and uses energy.

SUMMARY OF THE INVENTION

According to the present invention there is provided a process for processing natural gas to generate longer-chain hydrocarbons, the process comprising subjecting the natural gas to steam reforming at a pressure in the range 0.4 to 0.6 MPa (4 to 6 atmospheres) to generate a mixture of carbon monoxide and hydrogen, cooling the mixture, compressing this mixture using two successive compression stages with cooling between the two stages to a pressure in the range 1.8 to 2.2 MPa (18 to 22 atmospheres), and then subjecting this mixture to Fischer-Tropsch synthesis to generate longer chain hydrocarbons.

It will usually be necessary to adjust the pressure of the natural gas to a suitable pressure (e.g. between 0.4 and 0.6 MPa) before the natural gas is mixed with steam prior to reforming. Preferably the Fischer-Tropsch synthesis is performed at a pressure in the range 19–21 atmospheres. (In every case the value of the pressure is the absolute pressure.)

The process also generates a tail gas that contains hydrogen and a proportion of gaseous hydrocarbons. Preferably at least part of this tail gas is used to generate electricity, for example as fuel for a turbine used to drive a generator. This provides electric power not only for operating the process, for example to operate the compressors, but also provides excess electric power for other purposes.

The tail gas may also be used to convert any carbon dioxide in the natural gas into carbon monoxide, by performing the reverse water gas shift reaction upstream of the Fischer-Tropsch synthesis.

Preferably both the steam/methane reforming reaction and the Fischer-Tropsch synthesis are performed using compact catalytic reactors. Such a catalytic reactor preferably comprises a plurality of metal sheets in a stack, shaped and arranged to define first and second fluid flow channels, the channels being arranged alternately in the stack to ensure good thermal contact between the fluids in them. Appropriate catalysts should be provided where necessary, depending on the required reaction. To ensure the required good thermal contact, in the case of the steam/methane reforming reactor both the first and the second flow channels may be between 2 mm and 10 mm deep, preferably less than 6 mm deep in the direction normal to the sheets, more preferably in the range 5 mm to 3 mm deep; in the case of the Fischer-Tropsch reactor the channels for the reaction are preferably less than 10 mm deep. Corrugated or dimpled metallic foils, metal meshes, or corrugated or pleated metal felt sheets may be used as the substrate of a catalyst structure within the flow channels to enhance heat transfer and catalyst surface area. These catalyst structures are preferably removable from the grooves in the stack, so they can be replaced if the catalyst becomes spent.

Reactors of this type provide short diffusion path lengths, so that the heat and mass transfer rates can be high, and so the rates of chemical reactions can be high. Such a reactor can therefore provide a high power density.

The invention will now be further and more particularly described, by way of example only, and with reference to the accompanying drawings, in which:

DETAILED DESCRIPTION OF THE INVENTION

Figure 1:
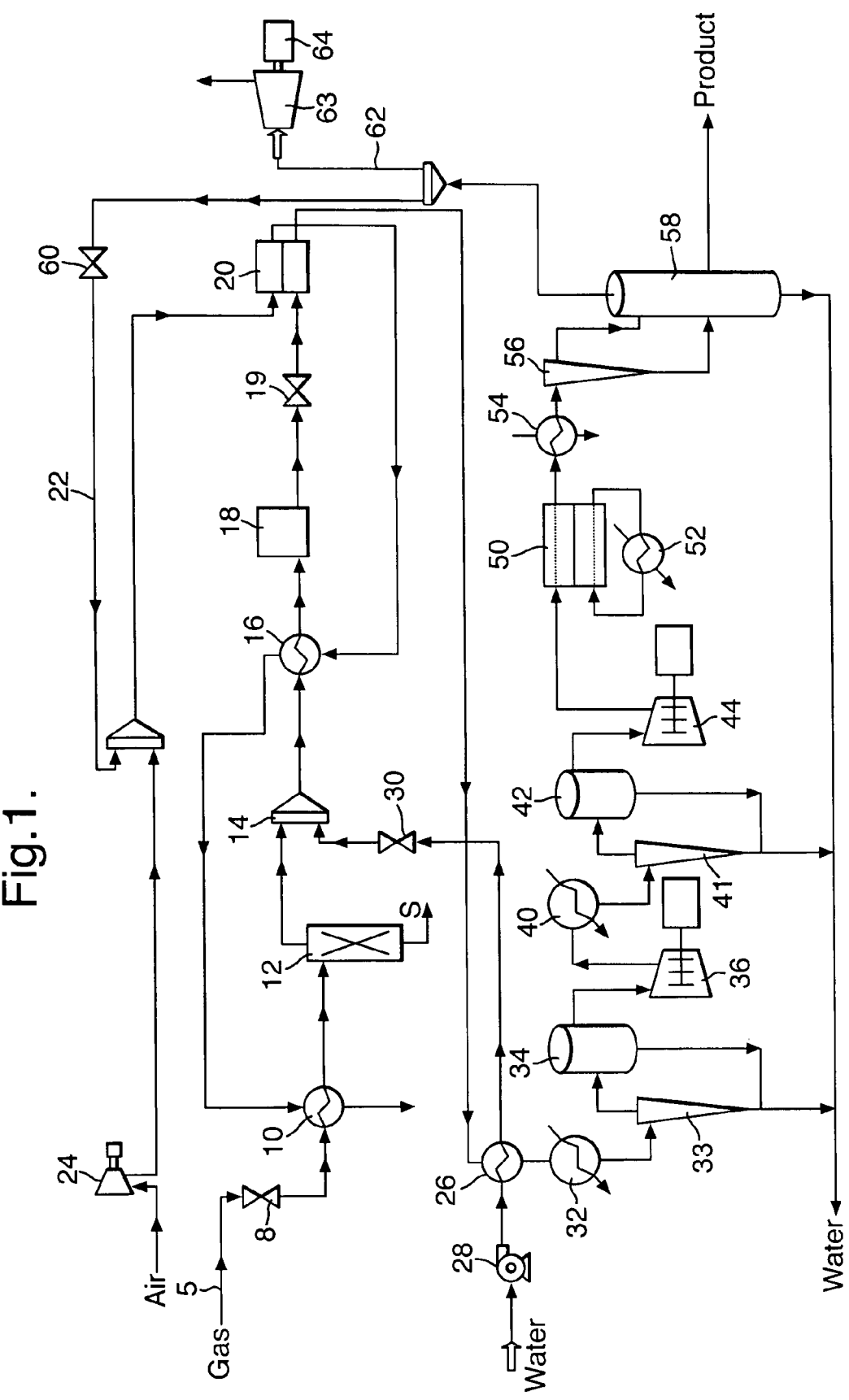
FIG. 1 shows a flow diagram of a chemical process of the invention.

The invention relates to a chemical process for converting natural gas (primarily methane) to longer chain hydrocarbons. The first stage involves steam reforming, that is to say the natural gas is mixed with steam and then undergoes the reaction

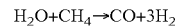

$$H_2O + CH_4 \rightarrow CO + 3H_2$$

This reaction is endothermic, and may be catalysed by a rhodium or platinum/rhodium catalyst in a first gas flow channel. The heat required to cause this reaction may be provided by combustion of an inflammable gas such as methane or hydrogen, which is exothermic and may be catalysed by a palladium catalyst in an adjacent second gas flow channel. In both cases the catalyst is preferably on a stabilised-alumina support which forms a coating typically less than 100 μm thick on the metallic substrate. The combustion reaction may take place at atmospheric pressure, but the reforming reaction should take place at between 4 and 5 atmospheres. The heat generated by the combustion would be conducted through the metal sheet separating the adjacent channels.

The gas mixture produced by the steam/methane reforming is then used to perform a Fischer-Tropsch synthesis to generate a longer chain hydrocarbon, that is to say:

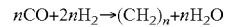

$$nCO + 2nH_2 \rightarrow (CH_2)_n + nH_2O$$

which is an exothermic reaction, occurring at an elevated temperature, typically between 190° C. and 280° C., for example 210° C., and an elevated pressure typically between 1.8 MPa and 2.1 MPa (absolute values), for example 2.0 MPa, in the presence of a catalyst such as iron, cobalt or fused magnetite, with a potassium promoter. The preferred catalyst for the Fischer-Tropsch synthesis comprises a coating of gamma-alumina of specific surface area 140–230 $m^2/g$ with about 10–40% cobalt (by weight compared to the alumina), and with a promoter such as ruthenium, platinum or gadolinium which is less than 10% the weight of the cobalt. The cobalt bearing gamma alumina layer on the surface of the metallic foil is typically 120–180 μm thick.

Referring now to FIG. 1, the overall chemical process is shown as a flow diagram in which the components of the plant are shown. The natural gas feed 5 consists primarily of methane with, in this example, a percentage of higher hydrocarbons $C_2$ to $C_{11}$. Typically these higher hydrocarbons are present at up to 10% v/v depending on the source of natural gas. The gas feed 5 may for example be at a pressure of 1.0 MPa (10 atmospheres).

The gas pressure is regulated by a valve 8 to 0.6 MPa and then the gas 5 is pre-heated to about 400° C. in a heat exchanger 10 using the hot exhaust gas from catalytic combustion, and is then fed to a solid bed de-sulphurising system 12 that reduces the sulphur content in the gas to 0.1 ppm or less. The de-sulphurised natural gas 5 is then mixed with steam, for example in a fluidic vortex mixer 14. The gas/steam mixture is heated in a heat exchanger 16 using the hot exhaust gas from catalytic combustion so that the gas mixture is at a temperature of 500° C. The mixture enters an adiabatic fixed bed pre-reformer 18 where it contacts a nickel or a platinum/rhodium based methanation catalyst. The higher hydrocarbons react with the steam to form methane and CO.

The gas mixture, consisting primarily of methane and steam and a small proportion of carbon monoxide, exits the pre-reformer 18 at a lower temperature typically 450° C. The pressure is then let down by a valve 19 to 0.45 MPa (absolute pressure) before entering a reformer 20. The reformer 20 is a compact catalytic reactor of the type described above, made from a stack of plates which define flow paths for endothermic and exothermic reactions which are in good thermal contact, and which contain appropriate catalysts, for example, on corrugated metal foil substrates. The reformer channels in the reformer 20 contain a platinum/rhodium catalyst, and the steam and methane react to form carbon monoxide and hydrogen. The temperature in the reformer increases from 450° C. at the inlet to about 800–850° C. at the outlet. The flow rates of steam and gas supplied to the mixer 14 are such that the steam:carbon molar ratio fed to the reformer 20 is between 1.2–1.6 and preferably between 1.3 and 1.5. Depending on the higher hydrocarbon content of the gas 5, the steam to carbon ratio at the inlet to the pre-reformer 18 will therefore need to be higher than this.

The heat for the endothermic reactions in the reforming reactor 20 is provided by the catalytic combustion of a mixture of short chain hydrocarbons and hydrogen which is the tail gas 22 from the Fischer-Tropsch synthesis; this tail gas 22 is combined with a flow of air provided by an air blower 24. The combustion takes place over a palladium/platinum catalyst within adjacent flow channels within the reforming reactor 20. The combustion gas path is at least approximately co-current relative to the reformer gas path. The catalyst may include gamma-alumina as a support, coated with a palladium/platinum mixture 3:1, which is an effective catalyst over a wide temperature range. The combustible gas mixture may be supplied in stages along the reactor 20 to ensure combustion occurs throughout the length of the combustion channels.

A mixture of carbon monoxide and hydrogen at above 800° C. emerges from the reformer 20 and is quenched to below 400° C. by passing it through a steam-raising heat exchanger 26. Water is supplied to this heat exchanger 26 by a pump 28, and the steam for the reforming process is hence supplied through a control valve 30 to the mixer 14. The gas mixture is further cooled in a heat exchanger 32 with cooling water to about 60° C., so the excess water condenses and is separated by passage through a cyclone 33 and a separator vessel 34. The gas mixture is then compressed by a compressor 36 to about 2.5 times the pressure, and is again cooled by a heat exchanger 40 before passing through a second cyclone 41 and a separator vessel 42 to remove any water that condenses. The separated water is re-cycled back to the steam raising circuit. The gas is then compressed to 20 atmospheres in a second compressor 44.

The stream of high pressure carbon monoxide and hydrogen is then fed to a catalytic Fischer-Tropsch reactor 50, this again being a compact catalytic reactor formed from a stack of plates as described above; the reactant mixture flows through one set of channels, while a coolant flows through the other set.

The reaction products from the Fischer-Tropsch synthesis, predominantly water and hydrocarbons such as paraffins, are cooled to condense the liquids by passage through a heat exchanger 54 and a cyclone separator 56 followed by a separating chamber 58 in which the three phases water, hydrocarbons and tail gases separate, and the hydrocarbon product is stabilised at atmospheric pressure. The hydrocarbons that remain in the gas phase and excess hydrogen gas (the Fischer-Tropsch tail gases 22) are collected and split. A proportion passes through a pressure reduction valve 60 to provide the fuel for the catalytic combustion process in the reformer 20 (as described above). The remaining tail gases 62 are fed to a gas turbine 63 which drives an electrical power generator 64.

The gas turbine 64 generates all the power for the plant and has the capacity to export a surplus. The major plant electrical power needs are the compressors 36 and 44, and the pumps 24 and 28; electricity may also be used to operate a vacuum distillation unit to provide process water for steam generation and to provide drinking water.

It will be appreciated, from the equations discussed above, that the steam reforming stage forms more hydrogen than is required for the Fischer-Tropsch synthesis. Consequently the tail gases 22 contain a significant quantity of hydrogen, as well as the lower alkanes (say C1 to C5). However, the tail gases 22 also contain a significant quantity of carbon monoxide. They can therefore be subjected to a second Fischer-Tropsch synthesis by passage through a second such reactor (not shown), so that the overall carbon monoxide conversion is increased, and somewhat more of the desired product is obtained.

The practical compression ratio for the compressors 36 and 44 is about 2.5:1. Operating the compressors at a higher pressure ratio would raise the temperature of the gas to such high levels that the shaft power requirement would become excessive. If the Fischer-Tropsch synthesis is to be carried out at about 2.0 MPa, the two compressors 36 and 44 are sufficient as long as the reformer 20 is at a pressure above about 0.4 MPa. Operating the steam/methane reforming reaction 20 at this elevated pressure has the disadvantage that methane conversion decreases, typically by about 5–10%, but this is more than offset by the reduction in capital and operating costs. In contrast, in order to operate with a single compressor, it would be necessary for the reforming to be carried out at a pressure of about 0.8 MPa, and this would decrease methane conversion by about 15%. And on the other hand, if the reforming reaction were to be carried out at 0.1 MPa (1 atmosphere), this would necessitate four successive compression stages, and would approximately double the power requirement.

A further benefit of performing reforming at this elevated pressure is on the size of pipework necessary. The gas velocity is typically no more than 18 m s$^{-1}$, so that for a particular mass flow rate, the necessary pipe diameter increases significantly as the gas pressure and density decreases. For example, for a plant with a production capacity of 1000 barrels of product per day, at a pressure of 0.5 MPa the volume flow rate of the hydrogen/carbon monoxide mixture (syngas) is about 48 000 m$^3$ h$^{-1}$, which requires a duct of diameter about 1.0 m. By contrast, if the pressure were at atmospheric, the gas volume would be 5 times larger and the duct would have to be of diameter about 2.2 m.

There are some situations in which the natural gas also contains carbon dioxide. In a modification to the process described above, some of the tail gas 22 (which is rich in hydrogen) is fed back to the natural gas/steam mixture at the mixer 14 so it flows through the pre-reformer 18. The tail gas 22 contains short-chain hydrocarbons, but these are converted to methane by the pre-reformer 18. The gas mixture entering the reformer 20 therefore contains methane, steam, hydrogen and carbon dioxide. The hydrogen can react with the carbon dioxide according to the reverse water gas shift reaction:

$$CO_2 + H_2 \rightarrow CO + H_2O$$

This reaction will occur in the reformer 20, and allows the carbon dioxide concentration to be reduced to the equilibrium level at the conditions of pressure and temperature in the reformer 20. (Even if the natural gas 5 contains no carbon dioxide, with a steam/methane ratio of 1.5 there would be a small proportion, about 5%, of carbon dioxide produced in the reformer 20.) Any additional carbon dioxide in the feed gas could therefore be converted to carbon monoxide, provided that there is enough free hydrogen available. The water vapour present in the tail gas 22, and the water produced by this reverse water gas shift reaction, must be taken into account when selecting the initial steam/methane ratio at the mixer 14.

I claim:

1. A process for processing natural gas to generate longer-chain hydrocarbons, the process comprising subjecting the natural gas to steam reforming at a pressure in the range 0.4 to 0.6 MPa to generate a mixture of carbon monoxide and hydrogen, cooling the mixture, compressing this mixture using two successive compression stages with cooling between the two stages to a pressure in the range 1.8 to 2.2 MPa, and then subjecting this mixture to Fischer-Tropsch synthesis to generate longer chain hydrocarbons.

2. A process as claimed in claim 1 wherein the Fischer-Tropsch synthesis is performed at a pressure in the range 1.9–2.1 MPa.

3. A process as claimed in claim 1 wherein the output from the Fischer-Tropsch synthesis is separated by condensation into a liquid phase and a tail gas, and at least part of this tail gas is used to generate electricity.

4. A process as claimed in claim 3 wherein electricity generated from the tail gas provides power to perform the two compression stages.

5. A process as claimed in claim 1 wherein water for the steam reforming reaction is obtained at least in part from a vacuum distillation unit.

6. A process as claimed in claim 3 wherein water for the steam reforming reaction is obtained at least in part from a vacuum distillation unit powered by electricity generated from the tail gas.

7. A process as claimed in claim 1 wherein both the steam/methane reforming reaction and the Fischer-Tropsch synthesis reaction are performed using respective compact catalytic reactors each comprising a plurality of metal sheets forming a stack, and defining first and second fluid flow channels, the channels being arranged alternately in the stack to ensure good thermal contact.

8. A process as claimed in claim 1 wherein the natural gas comprises some carbon dioxide, and the process also comprises separating the output from the Fischer-Tropsch synthesis into a liquid phase and a tail gas, and using at least part of the tail gas to perform the reverse water gas shift reaction upstream of the Fischer-Tropsch synthesis.

* * * * *